United States Patent [19]

Richardson et al.

[11] 3,999,286
[45] Dec. 28, 1976

[54] METHOD OF MAKING MULTITRACK HEADS

[75] Inventors: Harvey J. Richardson, Ventura; Robert J. Youngquist, Camarillo, both of Calif.

[73] Assignee: Minnesota Mining and Manufacturing Company, St. Paul, Minn.

[22] Filed: June 11, 1975

[21] Appl. No.: 586,055

[52] U.S. Cl. ............................ 29/603; 360/121; 360/124
[51] Int. Cl.² ........................................ G11B 5/42
[58] Field of Search ............ 29/603; 360/121, 124, 360/125, 127

[56] References Cited

UNITED STATES PATENTS

| | | | |
|---|---|---|---|
| 2,785,038 | 3/1957 | Ferber | 360/121 |
| 3,353,261 | 11/1967 | Bradford et al. | 29/603 |
| 3,634,933 | 1/1972 | Hanak | 29/603 |

*Primary Examiner*—Carl E. Hall
*Attorney, Agent, or Firm*—Alexander, Sell, Steldt & DeLaHunt

[57] ABSTRACT

A multitrack recording head having a pair of ferrite combs whose teeth are separated at their tips by non-magnetic gap spacers and whose bases are in abutting relationship. Each tooth of one comb has a wire coil for electrically transmitting signals to or from each track of the head.

2 Claims, 5 Drawing Figures

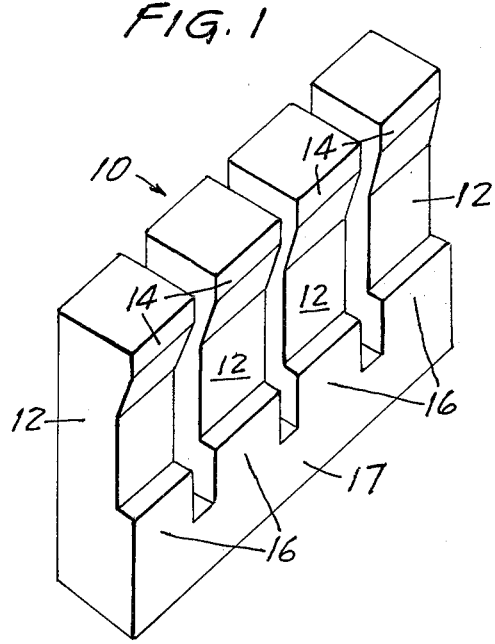
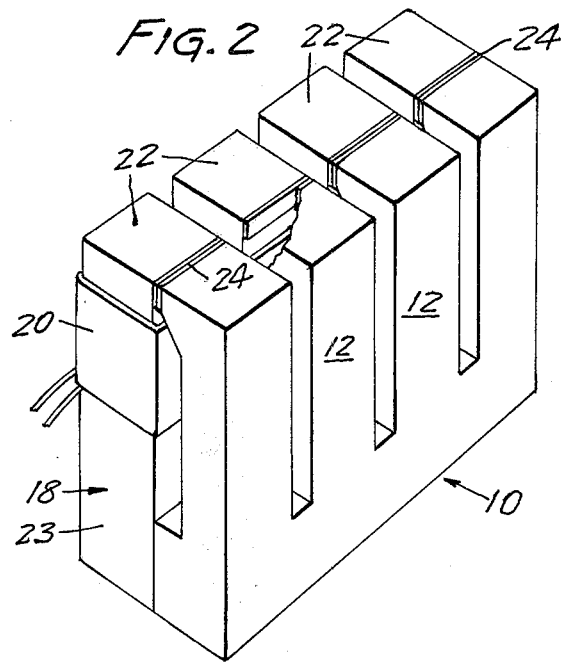
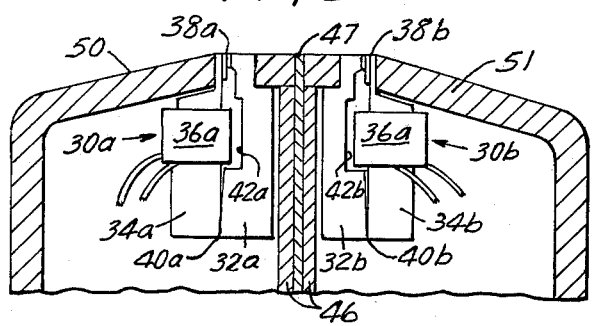
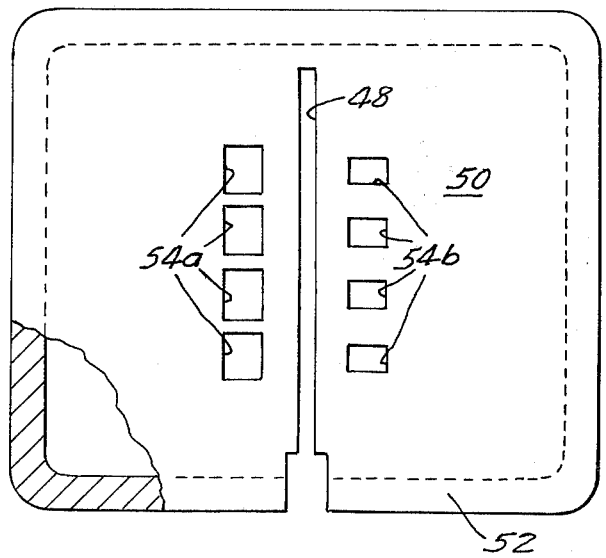
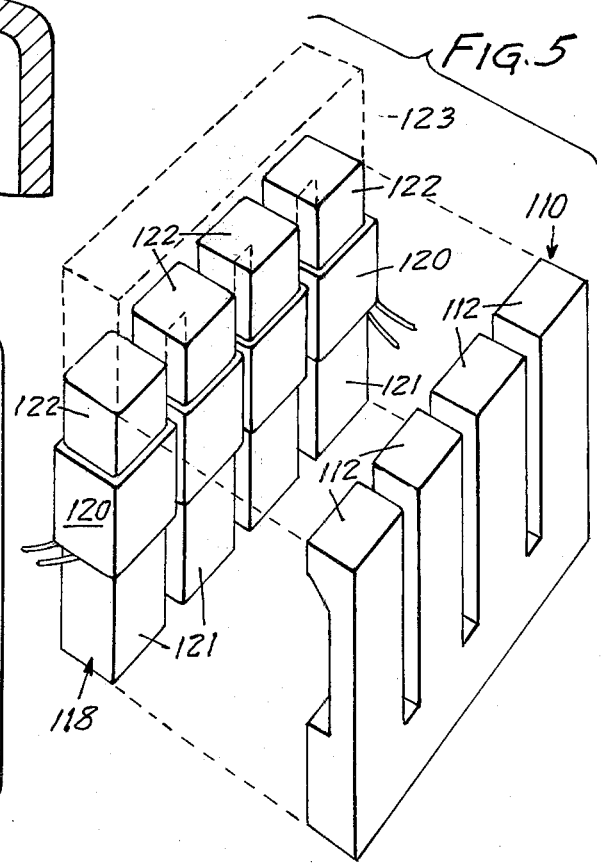

METHOD OF MAKING MULTITRACK HEADS

FIELD OF THE INVENTION

The invention concerns multitrack magnetic recording heads, especially for recording and reading digital data.

BACKGROUND OF THE INVENTION

Multitrack magnetic recording heads are usually manufactured by stacking individual cores in a half shell together with shields and spacers. After lapping the head interface to an optically flat surface, two half shells are joined with a spacer, either mechanically placed or vacuum deposited on one or both of the half shells. The front face of the head is then contoured to assure the proper head-to-tape relationship. Such manufacture requires careful control of tolerances in positioning the various components. When especially tight tolerances are required, it is customary to place an interface slot in each half shell. Because of such laborious techniques, precision multitrack heads are quite expensive and involve high reject rates.

THE PRESENT INVENTION

The construction of a multitrack head is simplified through the use of a pair of ferrite combs, each having a plurality of teeth. One side of each tooth has a smooth front gap surface and a smooth rear gap surface which are aligned with like surfaces of a tooth of the other comb when the combs are juxtaposed. A wire coil is applied to at least one of each pair of matching teeth, usually to each tooth of only one comb. The combs are then assembled in juxtaposition with the paired rear gap surfaces in contact with each other and the front gap surfaces separated by a nonmagnetic gap-spacer. Conveniently, the gap-spacers are provided by a vapor-deposited coating applied to the front gap surface of every tooth prior to assembly. After assembly, the front faces of the teeth adjacent the gap-spacers are finished to afford good head-to-tape contact.

Either the rear gap surfaces or the front gap surfaces of one or both combs may be adjacent to the tips of the teeth. If the rear gap surfaces of a comb are adjacent to the tips of the teeth, the base of the comb must be removed after assembly of the head. If all of the wire coils are carried by that comb, this minimizes crosstalk between tracks.

For greater economy of assembly, the front gap surfaces of both combs are adjacent to the tips of the teeth so that only a small amount of ferrite need be removed in finishing the faces of the teeth after assembly. The bases of the combs remain intact and tend to propagate crosstalk between tracks. The crosstalk can be minimized by so forming the comb to balance each magnetic bridge across adjacent tracks of the head. Where only the teeth of one comb bear wire coils, substantial balance condition occurs when $$\frac{R_m}{R_{c_1}} = \frac{R_{g_2}}{R_t}$$

where the head is to be used for reproduction and $$\frac{R_m}{R_{c_2}} = \frac{R_{g_1}}{R_t}$$

where the head is to be used for recording and $R_{c_1}$ = Reluctance from tip to foot of the wire-coil-bearing tooth of an energized head track, $R_{c_2}$ = Reluctance from tip to foot of the wire-coil-bearing tooth of an adjacent head track, $R_{g_1}$ = Reluctance across the front gap of said energized head track, $R_{g_2}$ = Reluctance across the front gap of said adjacent head track, $R_m$ = Reluctance across the space between the tips of said wire-coil-bearing teeth, and $R_t$ = Equivalent common reluctance of said two head tracks.

The foregoing assumes that the reluctance through each of the other teeth of the two head tracks is small compared to the reluctance $R_g$ across the gap. Conveniently, the balance may be achieved by adjusting the height of the base of the comb between each adjacent pair of teeth to provide the proper $R_t$. By designing each comb with identical teeth, identical spacing between adjacent teeth and identical gapspacers and by applying the wire coils only to the teeth of one comb, the thickness of the base of the comb between adjacent teeth may be constant.

THE DRAWING

The construction of the novel multitrack head will be better understood with reference to the drawing in which:

FIG. 1 shows in schematic perspective a comb formed from a single piece of ferrite;

FIG. 2 shows the positioning of the comb of FIG. 1 with a paired ferrite comb in the construction of a multitrack head of the present invention;

FIG. 3 schematically illustrates the manner in which two multitrack heads such as that of FIG. 2 may be positioned for read-after-write function;

FIG. 4 shows the face of a copper can in which the multitrack heads of FIG. 3 may be positioned;

FIG. 5 is a perspective view schematically illustrating the assembly of another multitrack head of the invention.

Referring to FIGS. 1 and 2, a multitrack head has been constructed using a sintered ferrite block having a low frequency permeability of more than 5000 and a coercive force of less than 0.1 oersted. First, the block is sawed into strips, each measuring about 63 × 4.8 × 1.3 mm. After its two broad faces have been lapped to mirror smoothness, the strip is sawed to provide a number of combs including the comb 10 as shown in FIG. 1 which has four teeth 12. One of the lapped faces provides at the tip of each tooth a smooth front gap surface 14, and at the foot of each tooth is a smooth rear gap surface 16 which together form a single rear gap surface extending across the base 17 of the comb 10. Another set of combs including the comb 18 shown in FIG. 2 is sawed from a similarly-lapped strip of the block.

Before assembling the combs 10 and 18 in the position shown in FIG. 2, a coating of titanium is vapor deposited to a thickness of about 1.0 micrometer onto each of their smooth front gap surfaces, and a wire coil 20 is slipped over each tooth 22 of the comb 18. Each pair of titanium coatings provides a nonmagnetic gap spacer 24 between the tips of each pair of teeth.

The head assembly of FIG. 2 may be positioned in a copper can (not shown) with the tips of each pair of teeth extending through an opening in the face of the can which is then filled with a thermosetting epoxy resin potting composition. After allowing the resin to cure, the tips of the teeth and the face of the can are contoured.

Substantial electrical balance to provide minimum crosstalk was achieved when the head assembly of FIG. 2 employed a ferrite comb 18 of the following dimensions:

Overall length: 6.0 mm
Overall height: 4.8 mm
Width of each tooth 22 in length direction: 1.3 mm
Thickness of each tooth 22: 1.3 mm
Height of base 23 between teeth: 0.76 mm The comb 10 had the same dimensions except that the thickness of each tooth was 0.91 mm where relieved to provide space for the wire coil on the paired tooth.

FIG. 3 shows two multitrack heads 30a and 30b, each similar in construction to the head assembly of FIG. 2. The write head 30a and the read head 30b respectively include a comb 32a, 32b and a juxtaposed comb 34a, 34b bearing a wire coil 36a, 36b. The front gap surface of each tooth of each comb has a vapor-deposited titanium coating to provide nonmagnetic gap-spacers 38a, 38b. Although the total thickness of each gap-spacer is small (e.g., 2.0 micrometers), it tends to prevent the rear gap surfaces of the juxtaposed combs from intimately contacting each other except at the lower corners 40a, 40b of the bases of the combs. Even so, there is substantial contact between the bases of the combs up to the recesses 42a, 42b at which the combs 32a, 32b are relieved to accommodate the wire coils.

The heads 30a and 30b are separated by a center shield consisting of a pair of thin copper sheets 46 adhesively bonded to a central sheet 47 of ferromagnetic material of high permeability ("MuMetal"). The high-permeability sheet fits into a slot 48 extending across the face 50 of the copper can 51 in which the heads 30a, 30b are assembled. As seen in FIG. 4 (which only shows the can 51), the slot 48 is enlarged at and extends the full length of one side 52 of the can to receive the edge of the center shield. This eliminates an electrical shorted turn around the write and read heads which otherwise would undesirably increase crossfeed from the write head 30a to the read head 30b.

Unlike the head assembly of FIG. 2 which is adapted for use as an independent read or write head, the tips of the teeth of the heads 30a, 30b which extend through the openings 54a, 54b in the face 50 of the copper can, especially the tips of the coil-bearing teeth, are reduced in area as viewed from the face 50 of the can and head assembly. This minimizes flux radiating between the tips of the write and read heads and thus reduces crossfeed. That portion of the face 50 of the copper can around each individual head track acts as a shorted turn. This tends to maintain zero net flux through the openings 54a, 54b, further reducing crossfeed from the write head 30a to the read head 30b.

FIG. 5 illustrates an alternative construction of a multitrack head wherein the rear gap surfaces 121 of the comb 118 to which wire coils 120 have been applied are at the tips of its teeth. The other comb 110 is used in the same way as the comb 10 of FIGS. 1–2. After assembling the head with the combs 118 and 110 in juxtaposition, the base 123 of the comb 118 is removed as indicated by the dotted lines, leaving four ferrite strips 122, each in juxtaposition with one of the teeth 112 of the comb 100. By so constructing a multitrack head, there is very little cross-talk between adjacent tracks.

If one wishes to position wire coils on teeth of both combs, it would be desirable to locate the front gap surfaces at the feet of the teeth of booth combs and to remove the base of each comb after assembly of the head.

We claim:

1. Method of making a multitrack magnetic recording head comprising the steps of
   a. forming a pair of ferrite combs, each having a plurality of teeth, the width of each tooth exceeding the spacing between adjacent teeth, one side of each tooth having a smooth front gap surface and a smooth rear gap surface which are aligned with like surfaces of a tooth of the other comb when the combs are juxtaposed, the rear gap surfaces of one comb being at the tips of its teeth and of the other comb being at its base,
   b. applying a wire coil to each tooth of said one comb,
   c. assembling the combs in juxtaposition with the paired rear gap surfaces in substantial contact with each other and the front gap surfaces separated by a nonmagnetic gap-spacer,
   d. removing the base of said one comb, and
   e. finishing the faces of the teeth adjacent the gap-spacer to afford good head-to-tape contact.

2. Method of making a multitrack recording head as defined in claim 1 including after step (d) the steps of
   d'. positioning the head in a conductive metal can, the face of which is formed with an opening to receive each pair of teeth,
   d''. potting the head with thermosetting resin, and the face of the can is contoured in the course of step (e).

* * * * *